Patented Mar. 1, 1932

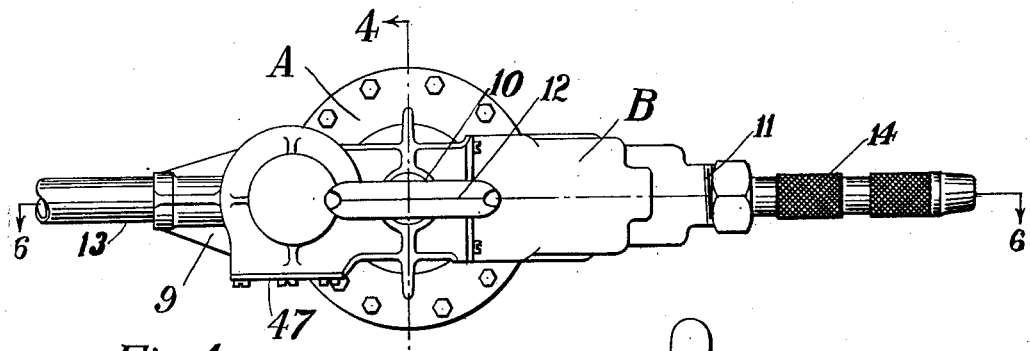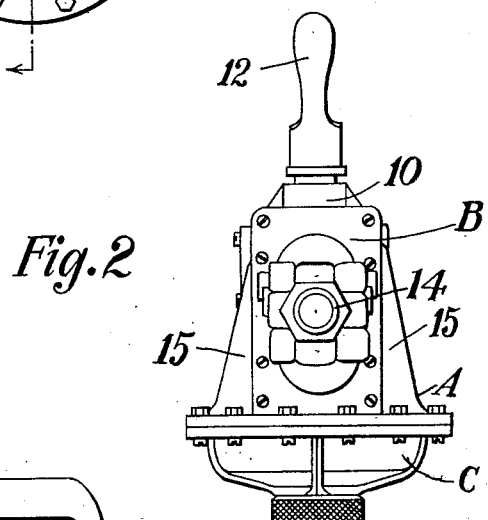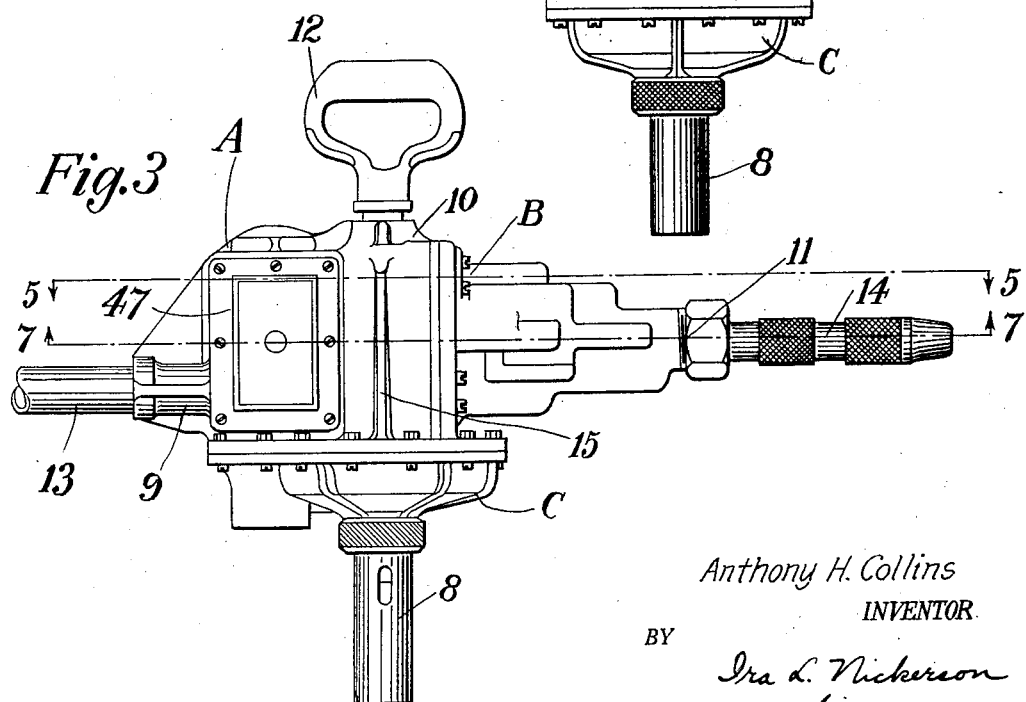

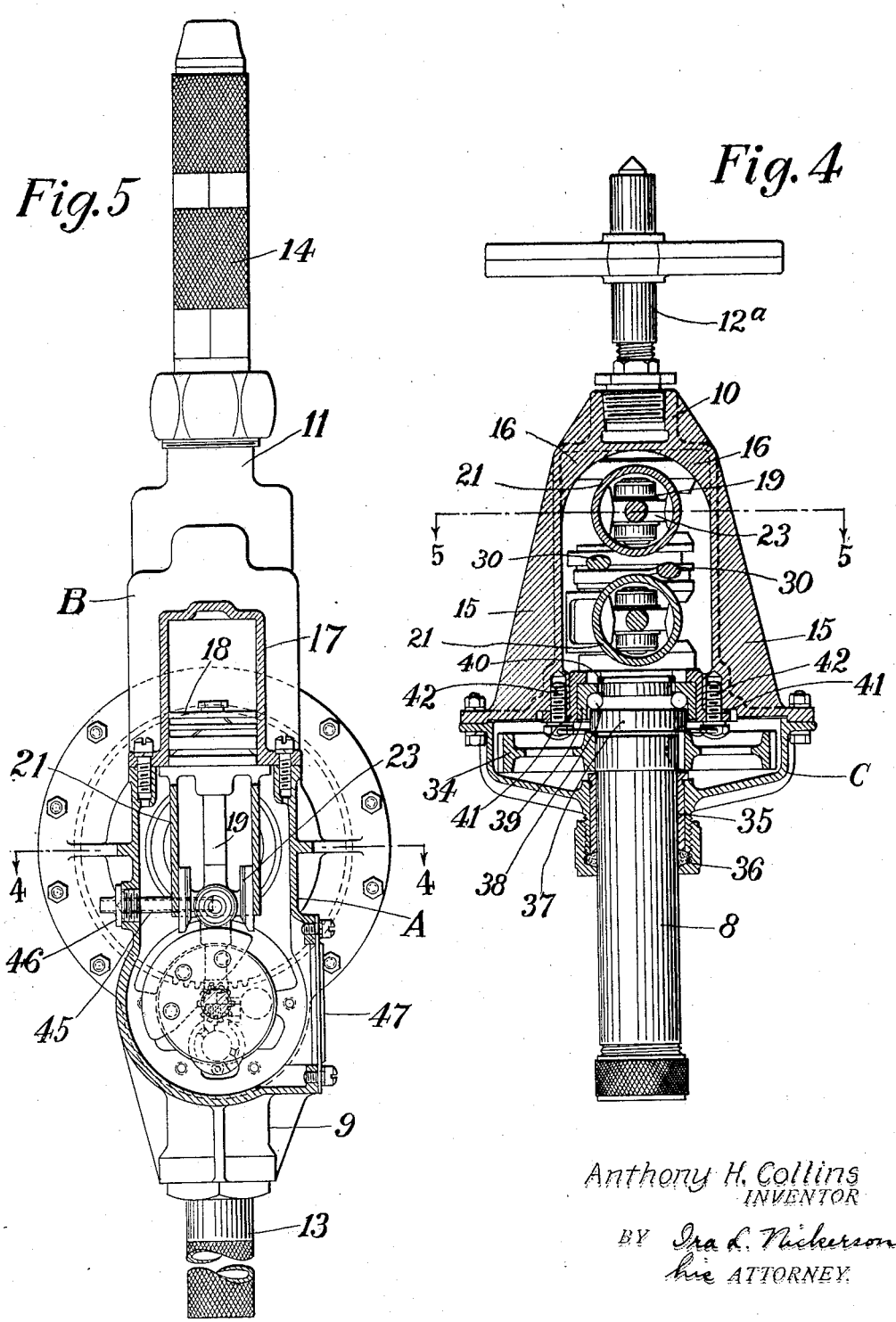

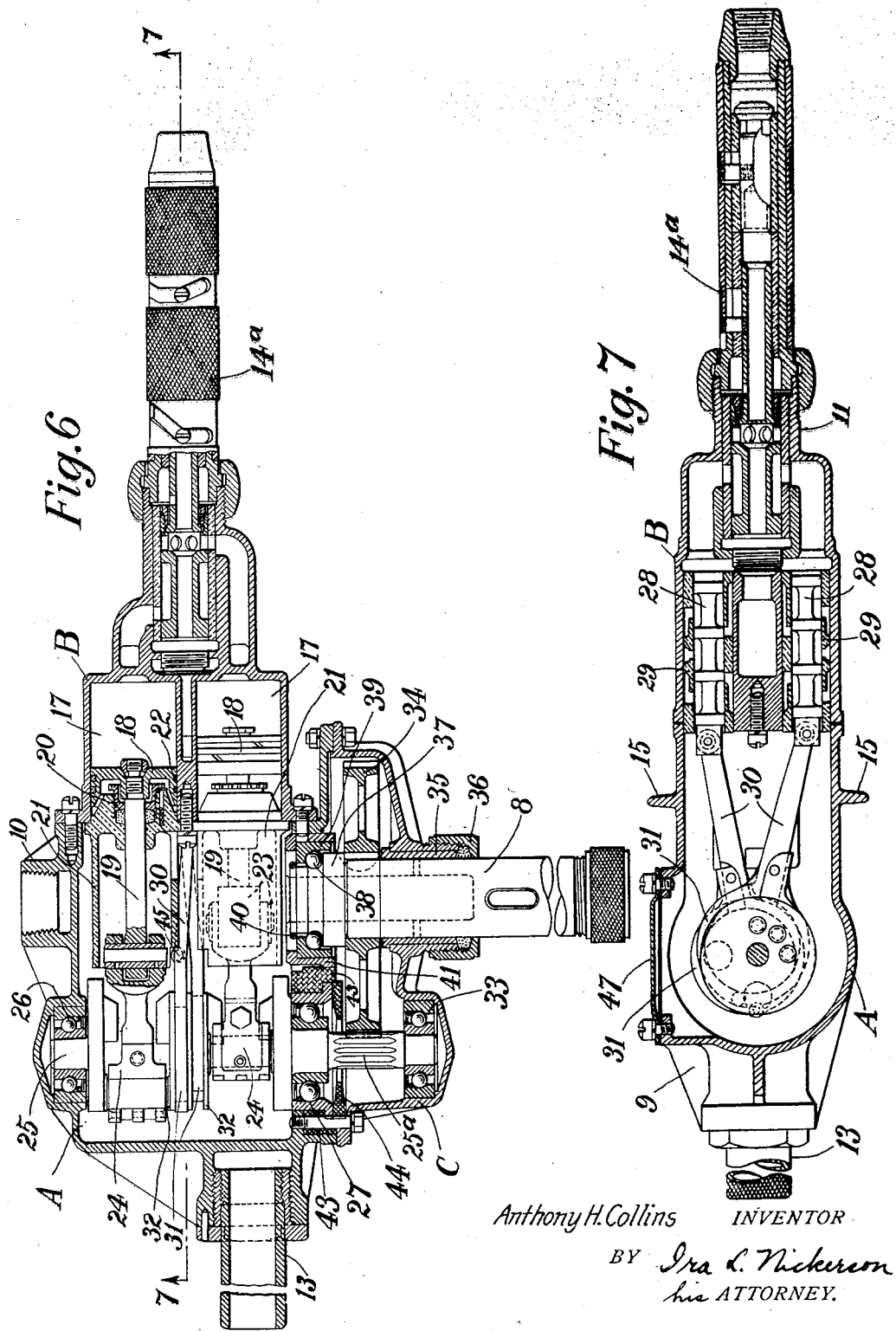

1,847,863

UNITED STATES PATENT OFFICE

ANTHONY H. COLLINS, OF CLEVELAND, OHIO, ASSIGNOR TO CHICAGO PNEUMATIC TOOL COMPANY, OF NEW YORK, N. Y., A CORPORATION OF NEW JERSEY

PORTABLE TOOL

Application filed January 22, 1924. Serial No. 687,685.

This invention relates to hand tools of the power driven type adapted for rotating a working tool at high speed. While the form of the invention herein disclosed is particularly designed for use in reaming and tapping, it is to be understood that it is capable of performing many other operations of a similar character, such as drilling, setting up screws and bolts, boring, etc.

One object of the invention is to provide a tool of the class described which shall have ample power for the purpose but shall also be light in weight, compact in form and characterized by nicety of balance and simplicity of construction. Another object is to so position the handles and controls thereon that the balance of the tool way be utilized to the fullest extent thereby to promote rapid and accurate work and to permit operation of the tool for long periods in all sorts of positions without fatigue to the operator. Another object is to make the operative parts easy of access for inspection and replacement. A further object is to make the tool light, compact and simple without sacrifice of that strength and sturdiness requisite in a tool of this kind. Other objects will be apparent from the detailed description which follows.

While it is to be understood that the invention in certain aspects is not limited to a tool driven by any one source of power, the embodiment of the invention chosen for the purpose of illustration and disclosed in the accompanying drawings is that of a fluid pressure operated tool. Referring now to the drawings which illustrate what is at present considered to be a preferred form of the invention:

Fig. 1 is a plan view;
Fig. 2 is a right end elevational view;
Fig. 3 is a side elevational view;
Fig. 4 is a vertical transverse sectional view on the line 4—4 of Figs. 1 and 5 and showing a feed screw on the top of the tool instead of a grip handle;
Fig. 5 is a horizontal sectional view on the line 5—5 of Figs. 3 and 4;
Fig. 6 is a vertical longitudinal sectional view on the line 6—6 of Fig. 1;
Fig. 7 is a horizontal sectional view on the line 7—7 of Figs. 3 and 6.

The tool illustrated comprises a casing in which the power mechanism is enclosed, the latter being arranged to rotate a tool holding spindle 8 disposed in general in symmetrical relation to the casing. To this end the spindle is substantially coincident with the center vertical line of the casing, which as shown comprises the main or crank shaft housing A, the motor cylinder housing B and the transmission housing C, the spindle 8 being rotatively mounted in the latter. Housing B is secured to one end of housing A, and housing C is bolted to the flanged circular base of housing A. The casing is provided with the webbed handle sockets 9 and 10 on the housing A and the socket 11 on the housing B. These sockets, as is evident from Figs. 1 and 2, are disposed in the same vertical plane with each other and with the spindle 8, the grip handle 12 or feed screw $12^a$ (Fig. 4) in socket 10 being in axial alignment with the spindle 8, and the "dead" handle 13 in socket 9 and the "live" handle 14 in socket 11 being on parallel horizontal axes and hence offset from each other. As is evident from Fig. 3, handle 13 is on substantially the center horizontal line of the combined housings A and C, while handle 14 is on the center horizontal line of motor housing B. This arrangement of opposed handles makes the tool exceptionally easy to handle, particularly as relates to disposing the spindle 8 accurately at an angle to the vertical.

Heretofore tools of this kind have been provided with opposed handles in axial alignment. Such a construction requires the operator to flex his wrists in order to swing the spindle up, a movement which is both awkward and tiring. With the opposing handles disposed offset and in the particular relation to the tool casing as herein described, the movement of the operator in swinging the spindle up is entirely different. One handle is held stationary and serves as an axis about which the tool is turned by lifting up the other handle which serves as a crank. Such a movement is easy and not exhausting even when repeated frequently for long periods.

In order to make the tool light as well as easy to handle, the housings A and C are constructed of any suitable light but strong metal such as aluminum or aluminum alloy. The main housing A has a bearing for the top of the spindle, as will be later described, so that the end thrust of the work must be supported by this housing. To strengthen housing A and enable it efficiently to withstand such thrust, the same is provided with external ribs 15 and internal ribs 16 forming an integral arched web springing from the spindle bearing and arching beneath the socket 10, as clearly shown in Fig. 4.

The interior mechanism of the tool will now be described, reference being had to Figs. 4 to 7 inclusive. The motor, which is in or carried by the motor housing B, is of the two cylinder double acting type and comprises the juxtaposed cylinders 17 (Fig. 6), in which reciprocate pistons 18, the latter having piston rods 19 attached thereto and extending through stuffing boxes 20 in guides 21 secured to the cylinder block in any suitable manner as by cap screws 22. The outer ends of the piston rods 19 form cross heads 23 slidable in the guides 21 and to the cross heads are pivoted connecting rods 24 connected in any suitable manner to the angularly disposed throws of the counterbalanced crank shaft 25 rotatably supported in bearings 26 and 27 in housing A. The inlet and exhaust of motive fluid to and from the opposite ends of the pistons 18 is controlled by suitable valves 28 (Fig. 7) reciprocable in bushings 29 secured in cored portions of motor housing B parallel to the axis of the cylinders and in a horizontal plane between the same. The valves are actuated by connecting rods 30 pivoted thereto and carrying eccentric straps 31 which fit around eccentrics 32 on crank shaft 25 intermediate the two throws thereof. For convenience in controlling the tool, the motive fluid throttle is preferably arranged on or as a part of the "live" handle 14. If the tool is to be used merely for reaming, a throttle valve only is required, but for tapping and drilling, a reversing throttle is necessary, a well-known throttle of the latter type 14ª being disclosed in Figs. 6 and 7.

The crank shaft 25 projects beyond the main housing A into the transmission housing C (Fig. 6) where a bearing 33 is provided for the end thereof. The portion of the crank shaft within housing C is provided with teeth forming a pinion 25ª which engages a gear 34 keyed upon the upper end of the spindle 8, the latter being disposed in parallelism with the shaft. Housing C fits over the spindle and as previously described, is bolted to the circular flange at the bottom of the housing A, a bushing 35 being provided for the spindle and a packing gland 36 for preventing the escape of lubricant around the spindle. The top of the spindle above gear 34 carries the ball race 37 engaged by the ball bearings 38 enclosed by the L shaped ball race 39 held on the spindle by the spring ring 40, these parts forming the above mentioned thrust and radial bearing which seats in a bushing 41 secured by means of the cap screws 42 (Fig. 4) to the casing A at the base of the arched web. The closing off of the crank chamber from the gear chamber partly effected by the end of the spindle and its bearing is further accomplished by a bearing plate 43 which is bolted to the housing A, as indicated in Fig. 6, and supports bearing 27 of the crank shaft 25. To restrain the lubricant in the gear chamber from passing through bearing 27 to the crank chamber when the tool is tipped, a baffle ring 44 is provided surrounding the pinion end of the crank shaft and clamped between housings A and C or, more specifically, upon bearing 27 and within the recess provided for the latter in plate 43.

Relief of pressure in the crank chamber when the tool is in operation is accomplished by a vent or breather pipe 45 fastened in a plug 46 which screws into an opening in the side of housing A (Fig. 5), the pipe extending well within the chamber. Access to the crank shaft and its connections is possible through a hand hole covered by a removable plate 47 on housing A. Through this hand hole, it is possible to disconnect the connecting rods of the piston and the valves whereupon on loosening the cap screws securing the motor housing B to the main housing A, the entire motor can be removed for inspection and repairs. By then removing the transmission housing C from the main housing A, the entire tool is readily dismantled.

From the above it will be apparent that a portable tool of exceptional compactness, lightness and strength is provided and that the relation of the housings of the various parts when assembled and the position of the spindle and handles relative to each other and to the component parts of the tool make for nicety of balance and resulting ease of handling and accuracy of work. Although but one embodiment of the invention has been disclosed, it is to be understood that the invention is not limited to the specific form herein shown and described but covers all forms and modifications within the scope of the appended claims.

Having now described my invention what I claim and desire to secure by Letters Patent is:

1. In a portable power driven hand tool, in combination, a casing for the power mechanism, a transmission housing secured to said casing, a spindle projecting from said housing substantially on the center line of said casing, opposed off-set handles on said casing in the same vertical plane with said spindle, and an arched web crossing said casing in the plane of said spindle for receiving the thrust of the latter.

2. In a portable power driven tool, in combination, a casing for the power mechanism, a transmission housing secured to said casing, a spindle projecting from said housing substantially on the center line of said casing, and an arched web formed by external and internal ribs on said casing in the plane of said spindle for receiving the thrust of the latter.

3. In a portable power driven tool, in combination, a casing for the power mechanism, a transmission housing secured to said casing, a spindle in substantial coincidence with the center line of said casing projecting from said housing and having a bearing in said casing, and an arched web formed by inner and outer ribs integral with said casing for supporting the thrust of said spindle.

4. In a portable power driven tool, in combination, a casing for the power mechanism, a transmission housing secured to said casing, a spindle in substantial coincidence with the center line of said casing projecting from said housing and having a bearing in said casing, a handle socket on said casing in line with said spindle, and a strengthening web in said casing crossing the latter and springing from said bearing and arching beneath said socket for supporting the thrust of said spindle.

5. A portable fluid-pressure tool comprising a housing having a crank shaft journaled therein, a cylinder housing secured to said crank housing, a transmission housing secured to said first-named housing having a bearing for said shaft, a spindle adapted to be driven by said shaft rotatably mounted in said transmission housing substantially in the central vertical plane of said tool, a handle socket in said first-named housing in the plane of said spindle, and a bearing for said spindle in said first-named housing, the latter being provided with a reinforcing rib springing from said spindle bearing and arching beneath said handle socket.

6. A portable fluid-pressure tool comprising a casing having juxtaposed cylinders, pistons in said cylinders operating a crank shaft within said casing, cross head guides interposed between said shaft and said cylinder housing, a transmission housing secured to said first-named housing having a spindle rotatably mounted therein and adapted to be driven by said shaft, said spindle being disposed beneath said guides and in parallelism with said shaft, a bearing for said spindle in said first-named housing, and a strengthening rib in said first-named housing crossing the latter and arching over said guides in the plane of said spindle for taking the thrust of the latter.

7. A portable fluid-pressure tool comprising a casing having juxtaposed cylinders, pistons in said cylinders operating a crank shaft within said casing, cross head guides interposed between said shaft and said cylinder housing, a transmission housing secured to said first-named housing having a spindle rotatably mounted therein and adapted to be driven by said shaft, said spindle being disposed beneath said guides and in parallelism with said shaft, a bearing for said spindle in said first-named housing, a handle or feed screw socket in line with and crossing said spindle, and a reinforcing rib integral with said first-named housing said rib springing from said spindle bearing and arching over said guides beneath said socket to take the thrust of said spindle.

8. A portable fluid pressure tool comprising a main housing having a crank shaft journaled therein, a motor housing comprising parallel juxtaposed cylinders with cross-head guides extending therefrom, said motor housing being secured to said main housing with the cross-head guides extending within the latter, a transmission housing secured to said main housing having a rotatable spindle arranged to be driven by said shaft, said spindle being disposed beneath and in substantial alignment with the perpendicular bisector of the axes of said cross-head guides, a bearing for the inner end of said spindle in said main housing, feeding means for said tool in line with said spindle, and an integral web in said main housing springing from said bearing and arching over said cross-head guides and beneath said means for supporting the thrust of said spindle.

Signed by me at Cleveland, Ohio, this 18th day of January, 1924.

ANTHONY H. COLLINS.

CERTIFICATE OF CORRECTION.

Patent No. 1,847,863.  Granted March 1, 1932, to

ANTHONY H. COLLINS.

It is hereby certified that error appears in the printed specification of the above numbered patent requiring correction as follows: Page 3, line 80, claim 7, strike out the words "and crossing" and insert the same after "with" in line 81, and after "housing" line 82, of same claim, insert a comma; and that the said Letters Patent should be read with these corrections therein that the same may conform to the record of the case in the Patent Office.

Signed and sealed this 5th day of April, A. D. 1932.

(Seal)

M. J. Moore,
Acting Commissioner of Patents.